(12) United States Patent
Aswal et al.

(10) Patent No.: US 12,363,170 B2
(45) Date of Patent: Jul. 15, 2025

(54) CLOUD-BASED RESOURCE DISCOVERY SYSTEM AND METHOD

(71) Applicant: Sophos Limited, Abingdon (GB)

(72) Inventors: Ashish Aswal, Rishikesh (IN); Alan Charles Toews, Billerica, MA (US); Laxmikant Agarwal, Bengaluru (IN)

(73) Assignee: Sophos Limited (GB)

( * ) Notice: Subject to any disclaimer, the term of this patent is extended or adjusted under 35 U.S.C. 154(b) by 154 days.

(21) Appl. No.: 18/237,017

(22) Filed: Aug. 23, 2023

(65) Prior Publication Data

US 2025/0023917 A1 Jan. 16, 2025

(30) Foreign Application Priority Data

Jul. 11, 2023 (IN) .............................. 202311046652

(51) Int. Cl.
| | |
|---|---|
| *G06F 15/173* | (2006.01) |
| *H04L 9/40* | (2022.01) |
| *H04L 41/08* | (2022.01) |
| *H04L 41/0894* | (2022.01) |

(52) U.S. Cl.
CPC .......... *H04L 63/20* (2013.01); *H04L 41/0883* (2013.01); *H04L 41/0894* (2022.05)

(58) Field of Classification Search
CPC .. H04L 63/20; H04L 41/0894; H04L 41/0883
See application file for complete search history.

(56) References Cited

U.S. PATENT DOCUMENTS

| | | | |
|---|---|---|---|
| 2005/0240990 A1* | 10/2005 | Trutner | H04L 63/0227 726/11 |
| 2010/0125567 A1* | 5/2010 | Morris | G06F 16/907 707/E17.005 |
| 2017/0295141 A1* | 10/2017 | Thubert | H04L 63/0209 |
| 2019/0245830 A1* | 8/2019 | Ratnasingham | H04L 63/20 |
| 2020/0274852 A1* | 8/2020 | Ahmed | H04L 63/0227 |
| 2024/0220304 A1* | 7/2024 | Boyer | H04L 63/1425 |

* cited by examiner

*Primary Examiner* — Joseph R Maniwang
(74) *Attorney, Agent, or Firm* — Danielson Legal LLC (57) ABSTRACT

Systems and methods for configuring a network security device. The methods include deploying a network security device on a network, wherein the network security device includes a network security device interface; accessing, via the network security device interface, a first cloud-based computing platform configured to request from a first library metadata associated with a first network resource on the first cloud-based computing platform; receiving at the network security device interface the metadata associated with the first network resource; and configuring the network security device in accord with the metadata associated with the first network resource.

20 Claims, 4 Drawing Sheets

CLOUD-BASED RESOURCE DISCOVERY SYSTEM AND METHOD

CROSS-REFERENCE TO RELATED APPLICATIONS

This application claims the benefit of and priority to IN Pat. App. No. 202311046652, filed on Jul. 11, 2023, and titled "Cloud-Based Resource Discovery System and Method", the disclosure of which is hereby incorporated by reference in its entirety.

TECHNICAL FIELD

The present application relates generally to systems and methods for monitoring network activity and, more particularly but not exclusively, to systems and methods for configuring network security devices

BACKGROUND

Deploying or otherwise configuring a network security device such as a firewall can be a complex and time-consuming process. In practice, a customer may purchase a security device from a vendor, and then attempt to configure the security device to protect their network. Configuring the security device may involve, for example, creating rules or policies regarding how the security device should operate. These policies may specify the types of traffic or activity that should or should not be allowed on the network, or other parameters associated with various types of network resource.

Configuring these devices requires personnel to have a thorough understanding of the topology of the network on which the device is deployed. For example, personnel may need to know which devices are on the network, how devices are configured, addresses of devices, subnet details, knowing which rules or policies should be implemented, or the like.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

The systems and methods described herein provide novel techniques for deploying a network security device on a network. The embodiments herein simplify the deployment process by executing a resource discovery engine to discover various types of metadata associated with network resources.

The embodiments herein may use the discovered metadata to update or otherwise configure the network security device. The resource discovery engine may periodically and continuously receive updates regarding network topology, and the network security device may be updated accordingly. The embodiments herein may also provide recommendations regarding products to use and device configuration recommendations.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The embodiments described herein provide novel techniques for configuring network security devices. Specifically, the described embodiments include a resource discovery engine to regularly update a network security device with network topology data, including metadata associated with network resources in a cloud-based environment. The network security device may be a firewall, for example.

The resource discovery engine may include a cloud interface implemented by one or more cloud-based network providers. Upon or after the resource discovery engine requests metadata associated with a network resource, a provider may reference a library pertaining to the provider's platform that stores data regarding the network resource. For example, the provider may use a native software development kit (SDK) to call application programming interfaces (APIs) associated with the cloud environment of interest.

The systems and methods herein may curate a database with the received metadata to create a resource inventory, and may also update any configuration rules or policies regarding the operation of the network security device. The systems and methods described herein may also provide recommendations to a user based on metadata associated with one or more network resources. For example, a recommendation engine may recommend activating a particular feature of a network resource or otherwise changing how the network resource is configured. Additionally and/or alternatively, the recommendation engine may recommend a particular product based on network topology.

Figure 1:
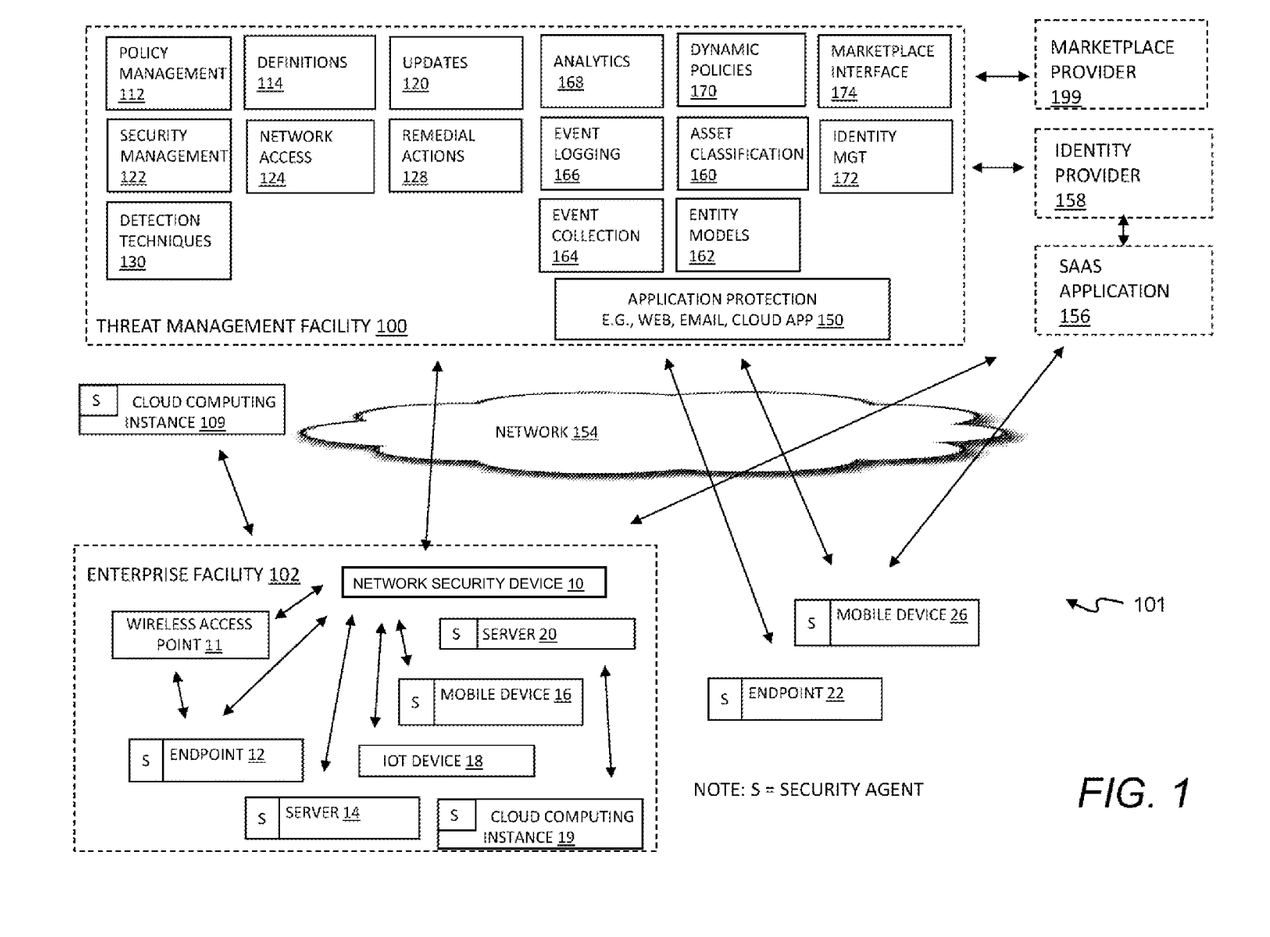
FIG. 1 illustrates a block diagram of a threat management system in accordance with one embodiment.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a network security device 10, a wireless access point 11, an endpoint 12, a server 14, a mobile device 16, an appliance or Internet-of-Things (IoT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a network security device 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or network security device 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or network security device 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or network security device 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or network security device 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or network security device 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or network security device 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. For example, the policy management facility 112 may be responsible for the lifecycle of various policies associated with the threat management facility 100, and can be hosted as a Software-as-a-Service (SaaS) solution. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or network security device 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a network security device 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as network security device 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

The embodiments described herein may involve deploying a network security device on a network such as the enterprise facility 102. In the described embodiments, the enterprise facility 102 may be associated with a customer that purchased a network security device 10 from a vendor. For example, the vendor may be associated with the threat management facility 100 or other platform.

Figure 2:
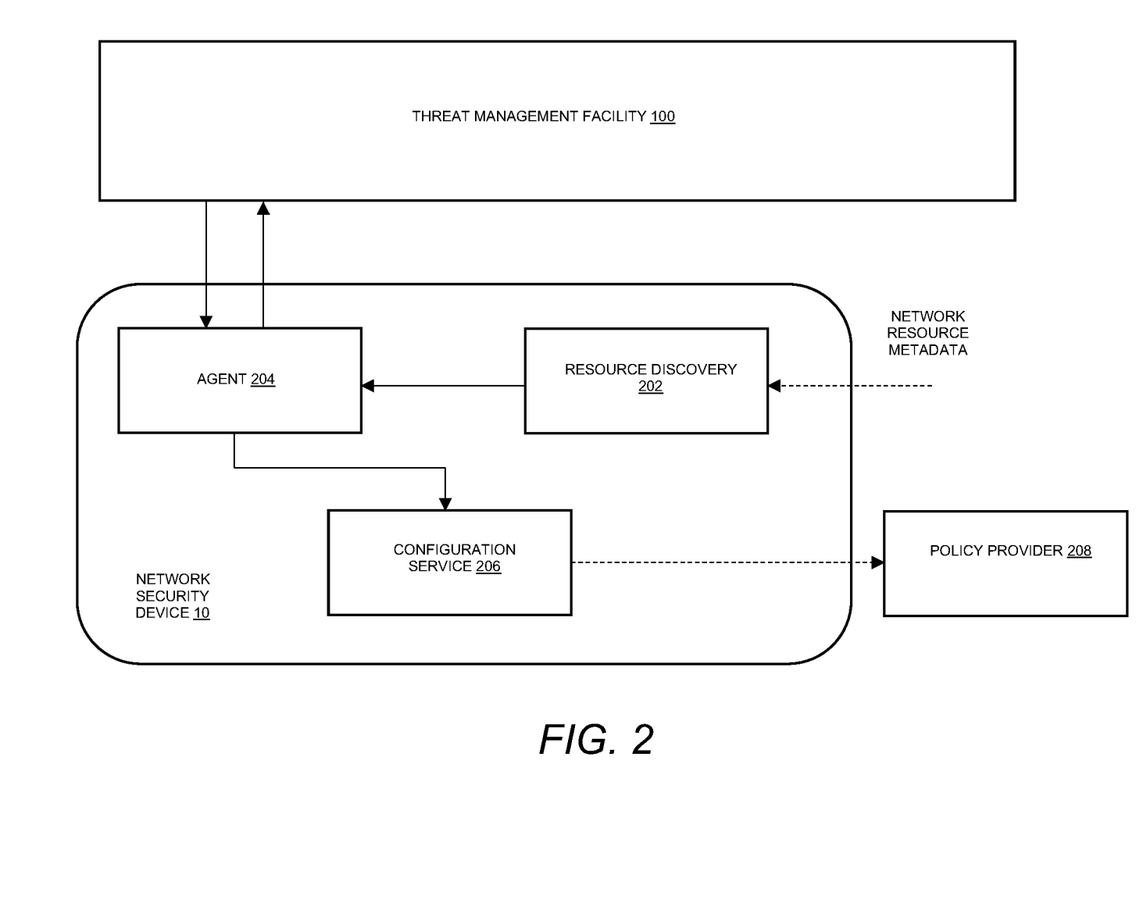
FIG. 2 illustrates the network security device of FIG. 1 in accordance with one embodiment.

FIG. 2 illustrates the network security device 10 of FIG. 1 in accordance with one embodiment. The network security device 10 may be a virtual firewall hosted on a cloud-based computing platform and tasked with filtering traffic associated with network resources.

For example, the network security device 10 may monitor the enterprise facility 102 and devices and activity occurring thereon. These devices may include, servers 14 and 20, IoT devices 18, mobile devices 16, or any other type of network resource whether available now or invented hereafter. The network security device 10 may provide network firewall features such as enforcing policies regarding traffic on the enterprise facility 102, traffic originating from the enterprise facility 102, traffic originating outside of the enterprise facility 102, or some combination thereof.

The network security device 10 may also provide protection in edge computing use cases. For example, the enterprise facility 102 may be hybrid in nature and use a combination of on-premise data centers and cloud-based data centers. Accordingly, the network security device 10 of the embodiments described herein may be located in cloud-based environments and provide the same type of protections that would be available whether the network security device 10 was located on-premise or at a remote location from a facility.

The network security device 10 may include or otherwise execute various modules such as a resource discovery engine 202, a security device agent 204, and a configuration service 206. In operation, the resource discovery engine 202 may gather metadata regarding network resources on one or more networks associated with the enterprise facility 102, and the configuration service 206 may configure the network security device 10 based on the gathered metadata. One embodiment of the resource discovery engine 202 is discussed in more detail with reference to FIG. 3.

The resource discovery engine 202 may also communicate the received metadata to the agent 204, which may then forward the metadata to one or more modules of the threat management facility 100. For example, the agent 204 may transmit data to the vendor of the network security device 10. This may keep the vendor informed of any updates or configurations of the security device 10 or the customer's network so that the vendor can provide meaningful customer support.

In some embodiments, a network resource may include or refer to a virtual machine. In these embodiments, the associated metadata may include public internet protocol (IP) addresses associated with the virtual machine; private IP addresses; network details corresponding to, for example, an associated virtual network, subnet, routing table(s), etc. The metadata may also indicate any security groups associated with the virtual machine, operating system used by the virtual machine, disks associated with the virtual machine, CPUs associated with the virtual machine, platform(s) associated with the virtual machine, or the like.

In some embodiments, a network resource may include or refer to network configurations. These may include configurations associated with virtual networks, network interfaces, routing tables, domain name system (DNS) zones, network address translation (NAT) gateways, load balancers, or some combination thereof.

In some embodiments, a network resource may refer to a database or storage location. In these embodiments, the metadata may relate to SQL databases, NoSQL databases, database clusters, accounts associated with the database, containers associated with the database, or some combination thereof.

In some embodiments a network resource may refer to web services executing on the enterprise facility 102. In these embodiments, metadata may include applications or services, application programming interfaces (API) gateways, web applications, or some combination thereof.

The agent 204 may also communicate the received data to a configuration service 206. The configuration service 206 may then autonomously provide any updates to the network security device 10. For example, the configuration service 206 may rely on a set of rules or policies governing how the network security device 10 should treat a network resource based on metadata associated with the network resource.

In some embodiments, the configuration service 206 is implemented as a background service that references rules or policies upon receiving metadata associated with the network resource. In some embodiments, the configuration service 206 may be implemented as a a component of a security product hosted on the enterprise facility 102.

In some embodiments, the configuration service 206 may be implemented as an application executing on a virtual machine. For example, the configuration service 206 may be an application executing on one or more virtual machines controlled by a hypervisor.

In some embodiments, metadata associated with a network resource may indicate that the network resource is suddenly transmitting a large amount of data. This may indicate or at least suggest that a malicious actor has gained control of the network resource and is exfiltrating data therefrom, possibly in furtherance of a malicious campaign.

Accordingly, the configuration service 206 may have a policy to prevent a network resource from transmitting a certain amount of data within some time period.

The configuration service 206 may also communicate any updates or resource metadata to a policy provider 208. The policy provider 208 may, for example, escalate a network resource for further analysis to mitigate the effects of any malicious activity. The policy provider 208 may include or otherwise reference a data storage to store policies or rules. The policy provider 208 may execute as a background service that, upon receipt of updates or resource metadata, may reference stored policies or rules to determine if there are any violations. Accordingly, in some embodiments, the policy provider 208 may execute on the enterprise facility 102 to steer traffic to protect the enterprise facility 102 or components thereon.

Figure 3:
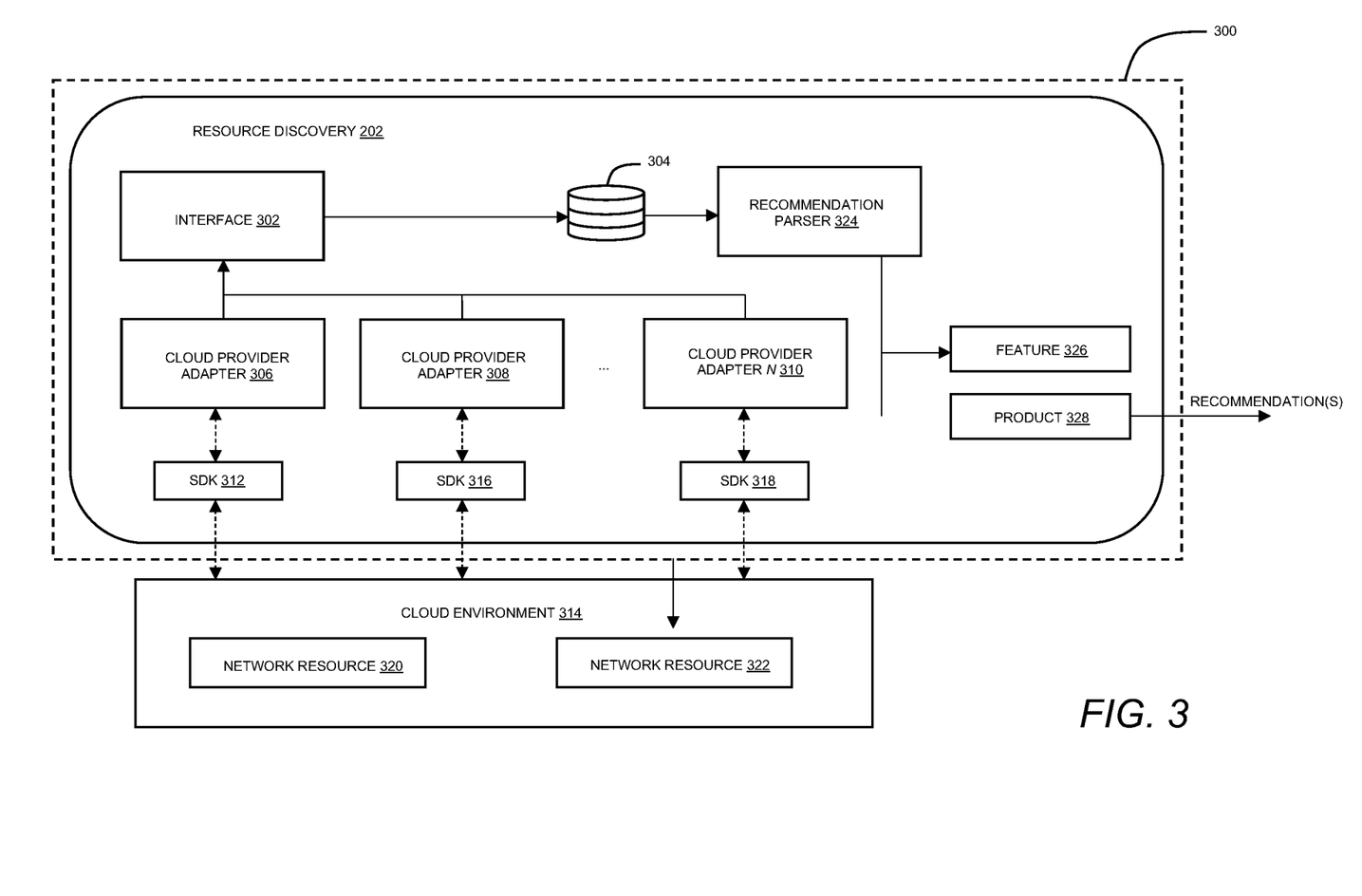
FIG. 3 illustrates the resource discovery engine of FIG. 2 in accordance with one embodiment.

FIG. 3 illustrates the resource discovery engine 202 of FIG. 2 in accordance with one embodiment. The resource discovery engine 202 may be configured as part of a computing pod or cluster of components (for simplicity, "pod 300"), and may be deployed in various types of cloud platforms. In general, a computing pod is a deployable computing unit that may be linked with one or more other computing units to form a single unit.

The resource discovery engine 202 may include network security device interface 302 (for simplicity, "interface 302") in communication with a database 304 for at least storing metadata regarding network resources. The database 304 may be a relational asset database storing metadata about network resources.

The interface 302 may be implemented by one or more cloud computing platforms or providers. The interface 302 may be in communication with each of these platforms by, for example, cloud provider adapter 306, cloud provider adapter 308, cloud provider adapter N 310, where N indicates the number of different cloud platforms implementing the interface 302. For example, the cloud providers may include Amazon Web Services (AWS), Azure, or any other type of cloud-based platform whether available now or created hereafter.

The embodiments described herein use an adapter software design pattern, and each cloud adapter 306, 308, 310$^N$ may implement the interface 302 for communicating gathered metadata. Accordingly, the resource discovery engine 202 can receive and act upon data received from different cloud classes.

Each adapter 306, 308, 310$^N$ may use or otherwise access a library such a native software development kit (SDK) for requesting data associated with network resources on its associated platform. For example, cloud provider adapter 306 may use a native SDK 312 for calling the cloud environment 314, adapter 308 may use native SDK 316 for calling the cloud environment 314, etc.

Adapter 306 may use its associated SDK 312 for calling an API of the cloud environment 314 to request and receive metadata associated with network resource 320. Adapter 308 may use its associated SDK 316 to request and receive metadata associated with network resource 322. These network resources may include databases, virtual machines, servers, CPUs, laptops, routers, etc. As discussed previously, the metadata associated with each of these network resources may relate to how they are configured, authorizations, policies, addresses, or the like.

The adapters 306, 308, 310$^N$ may forward the received metadata to the interface 302. The interface 302 may then communicate the metadata to the asset database 304. For example, the interface 302 may communicate the metadata as a JSON payload.

The resource discovery engine 202 may also include a recommendation parser 324, a feature recommendation engine 326, and a product recommendation engine 328. The feature recommendation engine 326 and product recommendation engine 328 may provide feature and product tuning recommendations, respectively, to customers and end users. For example, the feature recommendation engine 326 may provide recommendations to activate or deactivate certain features of a product such as the network security device 10. As another example, the product recommendation engine 328 may provide recommendations for security products such as firewalls, email security applications, web security applications, or the like . . . .

The feature recommendation engine 326 may include or otherwise reference a data storage including rules or otherwise recommendations for particular network devices or settings. For example, the data storage may include a resource inventory of several different types of products (firewalls, routers, email services, operating systems, etc.) from different vendors.

The embodiments described herein therefore provide vendors with deeper product portfolio visibility across their customers. This may help a vendor understand how their product(s) are being used, and to provide recommendations to their customers for maximizing their products. This may increase trust and improve the relationship between the customer and vendor.

The asset database 304 may store a network resource inventory as discussed above. The inventory may include various labels or tags associated with each network resource. For example, a resource may be labeled as "email server" or "web application server."

The recommendation parser 324 may parse metadata associated with the network resources (e.g., network resource 320). For example, the recommendation parser 324 may break down raw data associated with the network resource 320 into smaller elements as part of a parsing procedure. The recommendation parser 324 may execute bottom-up parsing procedures, for example, in which the recommendation parser 324 may incrementally generate a tree structure from a character in metadata, and work its way upwards until it reaches an actionable level. However, the recommendation parser 324 may implement parsing techniques in addition to or in lieu of this technique to accomplish the features of the embodiments herein.

The feature recommendation engine 326 may provide recommendations to a customer regarding one or more features. The feature recommendation module 326 may reference the asset database 304 or other data storage of a resource inventory of several different types of products (firewalls, routers, email services, operating systems, etc.), including products from different vendors. The asset database 304 or other resource inventory may include recommendations for certain products. For example, the tag or label of "web application server" may be associated with a tag of "web application firewall." Accordingly, the feature recommendation module 326 may recommend a customer enable a web application firewall feature if not enabled already. The feature recommendation module 326 may communicate this recommendation to personnel associated with the enterprise facility 102, for example.

The feature recommendation module 326 may also communicate this recommendation to the threat management facility 100 or otherwise to a vendor. This will enable to vendor to best understand how the customer's product(s) are operating and should be operating to provide more tailored and helpful support.

The product recommendation module 328 may provide recommendations to a customer regarding products that may be of interest to the customer. The product recommendation module 328 may reference the asset database 304 or other data storage of a resource inventory of several different types of products (firewalls, routers, email services, operating systems, etc.), including products from different vendors. The asset database 304 or other resource inventory may include recommendations for certain products. For example, the tag or label of "email server" may be associated with a tag of "email security product." Accordingly, the product recommendation module 328 may recommend a customer purchase an email security product from the vendor. The resource inventory, and the recommendation, may also include contact details (e.g., who the customer should contact) for a particular product.

Figure 4:
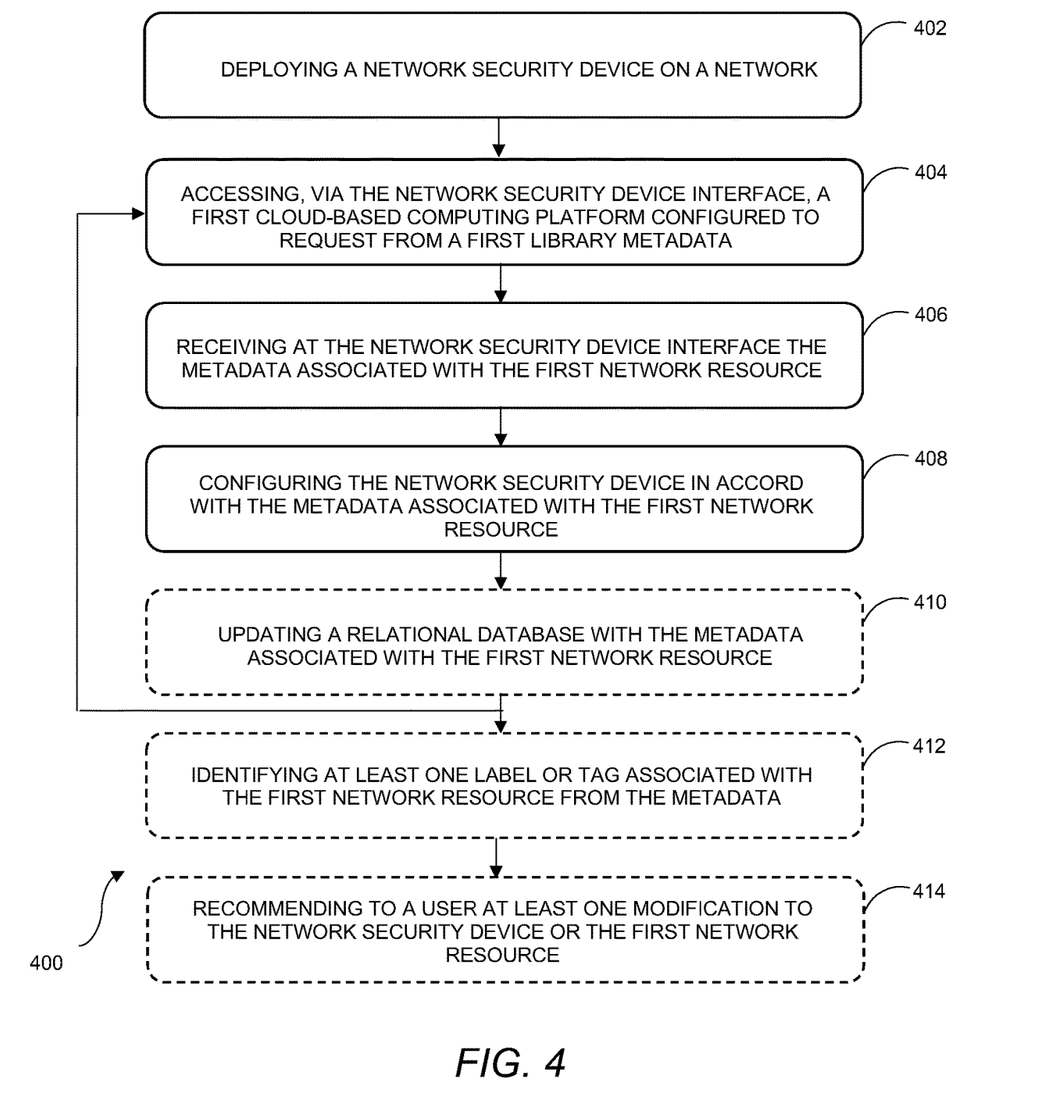
FIG. 4 depicts a flowchart of a method for configuring a network security device in accordance with one embodiment.

FIG. 4 depicts a flow chart of a method 400 for configuring a network security device 10 in accordance with one embodiment. The components of the threat management facility 100, the enterprise facility 102, or both, may perform one or more of the steps involved in method 400.

Step 402 involves deploying a network security device 10 on a network (such as one associated with the enterprise facility 102), wherein the network security device 10 includes a network security device interface 302. The network security device 10 may be a virtual firewall hosted on a cloud-based computing platform, for example.

Step 404 involves accessing, via the network security device interface 302, a first cloud-based computing platform 306 configured to request from a first library 312 metadata associated with a first network resource 320 on the first cloud-based computing platform 306. The network security device may include at least one of a virtual machine, a database, a web service, or a server. The first library 312 may be a software development kit provided by the provider, for example.

Step 406 involves receiving at the network security device interface 302 the metadata associated with the first network resource 320. The type of metadata received may vary and may depend on the type of the first network resource 320.

For example, if the first network resource 320 is a virtual machine, the received metadata may include its operating system, IP address(es), network details, or the like. As another example, if the first network resource 320 is a database, the received metadata may include data such as whether it is an SQL database, a NoSQL database, data regarding any associated database clusters, etc.

Step 408 involves configuring the network security device 10 in accord with the metadata associated with the first network resource 320. For example, the network security device 10 may specify which ports and protocols are to be used for the network resource 320, which routes are to be taken for network traffic associated with the network security device 10, etc.

As seen in FIG. 4, the above steps may be iterated so that the network security device 10 is routinely reconfigured or is otherwise updated based on the most recent metadata of the network resources. For example, the interface 302 may request metadata from the cloud environment at predetermined intervals (e.g., hourly, daily, weekly, etc.).

Step 410 involves updating a relational database with the metadata associated with the first network resource 320. Accordingly, the relational database 304 may include the most up-to-date metadata regarding the first network resource 320.

Step 412 involves identifying at least one label or tag associated with the first network resource 320 from the metadata. The recommendation parser 324 may analyze metadata stored in the database 304. The recommendation parser 324 may, for example, identify tags or labels indicating the type of network resource 320. The recommendation parser 324 may also identify other types of data, such as which features are enabled on the network resource 320 or how the network resource 320 is configured.

Step 414 involves recommending to a user at least one modification to the network security device 10 or the first network resource 320. For example, the recommendation engine 326 may recommend a user such as a customer enable or disable a certain feature on the network resource 320, the network security device 10, or both. Additionally and/or alternatively, the recommendation may relate to a different product for purchase, for example.

Method 400 may also include steps associated with a second network resource 322. For example, the steps of method 400 may be repeated to request and receive metadata associated with a second network resource 322 synchronously or asynchronously as they are being performed with respect to the first network resource 320.

In view of the above, the embodiments herein provide technical solutions in the field of network security and management. Existing techniques for configuring network security devices are complex and error-prone, as security personnel must have an extensive knowledge of the topology of the network on which a security device is deployed. For example, personnel may in accordance with existing techniques log in to a portal (e.g., a portal associated with their provider) to view data regarding network resources on a network. The personnel may then have to manually inspect data associated with the network resources, and then update any rules or policies based on the inspected data.

The embodiments herein, on the other hand, can programmatically obtain metadata associated with network resources in a cloud environment. The embodiments herein may request network resource metadata from a cloud provider that is hosting the network resource. As discussed above, multiple cloud providers may implement an interface 302 using an adapter software design pattern. These providers may then each call their own, native SDKs to gather metadata associated with network resources hosted by each provider. This ensures that the network security device 10 is routinely updated and configured to manage network activity based on network resources and their associated metadata.

According to one aspect, embodiments relate to a method for configuring a network security device. The method includes deploying a network security device on a network, wherein the network security device includes a network security device interface; accessing, via the network security device interface, a first cloud-based computing platform configured to request from a first library metadata associated with a first network resource on the first cloud-based computing platform; receiving at the network security device interface the metadata associated with the first network resource; and configuring the network security device in accord with the metadata associated with the first network resource.

In some embodiments, the method further includes updating a relational database with the metadata associated with the first network resource. In some embodiments, the method further includes autonomously iterating, for multiple network resources on the first cloud-based computing platform, the steps of receiving at the network security device interface metadata associated with each of the multiple network resources, updating the relational database with the metadata associated with each of the multiple network resources, and configuring the deployed network security device in accord with the metadata associated with each of the multiple network resources.

In some embodiments, the method further includes accessing via the network security device interface a second cloud-based computing platform, wherein the second cloud-based computing platform is configured to request from a second library metadata associated with a second network resource on the second cloud-based computing platform; receiving at the network security device interface the metadata associated with the second network resource; updating the relational database with the metadata associated with the second network resource; and configuring the deployed network security device in accord with the metadata associated with the second network resource.

In some embodiments, wherein the first network resource includes at least one of a virtual machine, a database, a web service, or a server.

In some embodiments, the network security device is a virtual firewall hosted on the first cloud-based computing platform.

In some embodiments, the first library is a software development kit provided by the first cloud-based computing platform.

In some embodiments, configuring the network security device in accord with the metadata associated with the first network resource includes establishing a rule or policy regarding the first network resource.

According to another aspect, embodiments relate to a system for monitoring network activity. The system includes a network security device, wherein the network security device includes a network security device interface configured to: access a first cloud-based computing platform, wherein the first cloud-based computing platform is configured to request from a first library metadata associated with a first network resource on the first cloud-based computing platform, and receive the metadata associated with the first network resource; and one or more processors executing instructions stored on memory to configure the network security device in accord with the metadata associated with the first network resource.

In some embodiments, the system further includes a relational database for storing the metadata associated with the first network resource. In some embodiments, the network security device is configured to, for multiple network resources on the first cloud-based computing platform, iteratively receive metadata associated with each of the multiple network resources, and the one or more processors are further configured to configure the network security device in accord with the metadata associated each of the multiple network resources.

In some embodiments, the network security device is further configured to access a second cloud-based computing platform configured to request from a second library metadata associated with a second network resource on the second cloud-based computing platform, and receive the metadata associated with the second network resource, wherein the one or more processors are further configured to configure the network security device in accord with the metadata associated with the second network resource.

In some embodiments, wherein the first network resource includes at least one of a virtual machine, a database, a web service, or a server.

In some embodiments, the network security device is a virtual firewall hosted on the first cloud-based computing platform.

In some embodiments, the first library is a software development kit provided by the first cloud-based computing platform.

In some embodiments, the one or more processors configure the network security device in accord with the metadata associated with the first network resource by establishing a rule or policy regarding the first network resource.

In some embodiments, the system further includes a metadata parser module to identity at least one label or tag associated with the first network resource from the metadata, and a recommendation engine to recommend to a user at least one modification to the network security device or the first network resource.

According to yet another aspect, embodiments relate to a computer program product for configuring a network security device, the computer program product comprising computer executable code embodied in one or more non-transitory computer readable media that, when executing on one or more processors, performs the steps of: deploying a network security device on a network, wherein the network security device includes a network security device interface; accessing, via the network security device interface, a first cloud-based computing platform configured to request from a first library metadata associated with a first network resource on the first cloud-based computing platform; receiving at the network security device interface the metadata associated with the first network resource; and configuring the network security device in accord with the metadata associated with the first network resource.

In some embodiments, the computer program product further includes computer executable code that, when executing on the one or more processors, performs the step of updating a relational database with the metadata associated with the first network resource The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for configuring a network security device, the method comprising:
   deploying a network security device on a network, wherein the network security device includes a network security device interface;
   accessing, via the network security device interface, a first cloud-based computing platform configured to request from a first library metadata associated with a first network resource on the first cloud-based computing platform;
   receiving at the network security device interface the metadata associated with the first network resource; and
   configuring the network security device in accord with the metadata associated with the first network resource.

2. The method of claim 1 further comprising updating a relational database with the metadata associated with the first network resource.

3. The method of claim 2 further comprising autonomously iterating, for multiple network resources on the first cloud-based computing platform, the steps of:
   receiving at the network security device interface metadata associated with each of the multiple network resources;
   updating the relational database with the metadata associated with each of the multiple network resources; and
   configuring the deployed network security device in accord with the metadata associated with each of the multiple network resources.

4. The method of claim 1 further comprising:
   accessing via the network security device interface a second cloud-based computing platform, wherein the second cloud-based computing platform is configured to request from a second library metadata associated with a second network resource on the second cloud-based computing platform;
   receiving at the network security device interface the metadata associated with the second network resource;
   updating the relational database with the metadata associated with the second network resource; and
   configuring the deployed network security device in accord with the metadata associated with the second network resource.

5. The method of claim 1 wherein the first network resource includes at least one of a virtual machine, a database, a web service, or a server.

6. The method of claim 1 wherein the network security device is a virtual firewall hosted on the first cloud-based computing platform.

7. The method of claim 1 wherein the first library is a software development kit provided by the first cloud-based computing platform.

8. The method of claim 1 wherein configuring the network security device in accord with the metadata associated with the first network resource includes establishing a rule or policy regarding the first network resource.

9. The method of claim 1 further comprising:
   identifying at least one label or tag associated with the first network resource from the metadata; and
   recommending to a user at least one modification to the network security device or the first network resource.

10. A system for monitoring network activity, the system comprising:
    a network security device, wherein the network security device includes a network security device interface configured to:
      access a first cloud-based computing platform, wherein the first cloud-based computing platform is configured to request from a first library metadata associated with a first network resource on the first cloud-based computing platform, and
      receive the metadata associated with the first network resource; and
    one or more processors executing instructions stored on memory to configure the network security device in accord with the metadata associated with the first network resource.

11. The system of claim 10 further comprising a relational database for storing the metadata associated with the first network resource.

12. The system of claim 11 wherein the network security device is configured to, for multiple network resources on the first cloud-based computing platform, iteratively receive metadata associated with each of the multiple network resources, and the one or more processors are further configured to configure the network security device in accord with the metadata associated each of the multiple network resources.

13. The system of claim 10 wherein the network security device is further configured to:
- access a second cloud-based computing platform configured to request from a second library metadata associated with a second network resource on the second cloud-based computing platform, and
- receive the metadata associated with the second network resource, wherein the one or more processors are further configured to configure the network security device in accord with the metadata associated with the second network resource.

14. The system of claim 10 wherein the first network resource includes at least one of a virtual machine, a database, a web service, or a server.

15. The system of claim 10 wherein the network security device is a virtual firewall hosted on the first cloud-based computing platform.

16. The system of claim 10 wherein the first library is a software development kit provided by the first cloud-based computing platform.

17. The system of claim 10 wherein the one or more processors configure the network security device in accord with the metadata associated with the first network resource by establishing a rule or policy regarding the first network resource.

18. The system of claim 10 further comprising:
- a metadata parser module to identity at least one label or tag associated with the first network resource from the metadata, and
- a recommendation engine to recommend to a user at least one modification to the network security device or the first network resource.

19. A computer program product for configuring a network security device, the computer program product comprising computer executable code embodied in one or more non-transitory computer readable media that, when executing on one or more processors, performs the steps of:
- deploying a network security device on a network, wherein the network security device includes a network security device interface;
- accessing, via the network security device interface, a first cloud-based computing platform configured to request from a first library metadata associated with a first network resource on the first cloud-based computing platform;
- receiving at the network security device interface the metadata associated with the first network resource; and
- configuring the network security device in accord with the metadata associated with the first network resource.

20. The computer program product of claim 19 further comprising computer executable code that, when executing on the one or more processors, performs the step of updating a relational database with the metadata associated with the first network resource.

* * * * *